(12) United States Patent
Rich et al.

(10) Patent No.: US 10,210,235 B2
(45) Date of Patent: *Feb. 19, 2019

(54) DECLARATIVE DATA WAREHOUSE DEFINITION FOR OBJECT-RELATIONAL MAPPED OBJECTS

(71) Applicant: International Business Machines Corporation, Armonk, NY (US)

(72) Inventors: Lawrence S. Rich, Cary, NC (US); Rafik Jaouani, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 951 days.

This patent is subject to a terminal disclaimer.

(21) Appl. No.: 14/690,662

(22) Filed: Apr. 20, 2015

(65) Prior Publication Data

US 2015/0227607 A1 Aug. 13, 2015

Related U.S. Application Data

(63) Continuation of application No. 12/109,935, filed on Apr. 25, 2008, now Pat. No. 9,043,273.

(51) Int. Cl.
*G06F 7/00* (2006.01)
*G06F 17/30* (2006.01)
*G06N 5/02* (2006.01)

(52) U.S. Cl.
CPC .. *G06F 17/30592* (2013.01); *G06F 17/30091* (2013.01); *G06F 17/30563* (2013.01);
(Continued)

(58) Field of Classification Search
CPC ......... G06F 17/30592; G06F 17/30563; G06F 17/30864; G06F 17/30091
(Continued)

(56) References Cited

U.S. PATENT DOCUMENTS 6,167,405 A 12/2000 Rosensteel
6,208,990 B1 3/2001 Suresh et al.
(Continued)

OTHER PUBLICATIONS

Kimball, R. et al., "The Data Warehouse Toolkit, 2d Ed.," in The Complete Guide to Dimensional Modeling, John Wiley & Sons, Inc., Apr. 2002, 449 Pg.
(Continued)

*Primary Examiner* — Binh V Ho
(74) *Attorney, Agent, or Firm* — Cuenot, Forsythe & Kim, LLC

(57) ABSTRACT

A data warehouse is constructed using the relational mapping of a transactional database without reconstructing the data relationships of the transactional database. First, an application programmer analyzes an object model in order to describe facts and dimensions using the objects, attributes, and paths of the object model. Each of the dimensions has an identifier that correlates an item in the transactional database to a dimension record in the data warehouse. The fact and dimension descriptions are saved to a description file. Second, a Data Warehouse Engine (DWE) then access the description file and uses the object model, fact and dimension descriptions, and object-relational mapping to map transactional data to the data warehouse.

18 Claims, 6 Drawing Sheets

(52) U.S. Cl.
CPC .. *G06F 17/30607* (2013.01); *G06F 17/30864* (2013.01); *G06N 5/02* (2013.01)

(58) Field of Classification Search
USPC .......................................................... 707/800
See application file for complete search history.

(56) References Cited

U.S. PATENT DOCUMENTS

| | | | |
|---|---|---|---|
| 6,587,856 B1 | 7/2003 | Srinivasan et al. | |
| 6,745,196 B1 | 6/2004 | Colyer et al. | |
| 6,775,675 B1 | 8/2004 | Nwabueze et al. | |
| 7,113,964 B1 | 9/2006 | Bequet et al. | |
| 7,143,107 B1 * | 11/2006 | Nebres, Jr. ........ | G06F 17/30392 707/603 |
| 7,152,073 B2 | 12/2006 | Gudbjartsson et al. | |
| 7,181,450 B2 * | 2/2007 | Malloy ............. | G06F 17/30592 |
| 7,475,080 B2 * | 1/2009 | Chowdhary ...... | G06F 17/30607 |
| 7,672,924 B1 | 3/2010 | Scheurich et al. | |
| 7,805,462 B2 | 9/2010 | Dupont et al. | |
| 8,176,002 B2 * | 5/2012 | Murphy ............ | G06F 17/30592 707/600 |
| 8,280,754 B2 * | 10/2012 | Chowdhary ...... | G06F 17/30572 705/7.11 |
| 8,510,182 B2 | 8/2013 | Pannicke et al. | |
| 2002/0099563 A1 * | 7/2002 | Adendorff ......... | G06F 17/30563 705/7.11 |
| 2002/0116389 A1 * | 8/2002 | Chen ................... | G06F 17/3061 |
| 2002/0133368 A1 * | 9/2002 | Strutt ................ | G06F 17/30592 705/7.11 |
| 2004/0181440 A1 | 9/2004 | Yeh et al. | |
| 2005/0246357 A1 | 11/2005 | Geary et al. | |
| 2009/0055439 A1 * | 2/2009 | Pai .................... | G06F 17/30525 |
| 2009/0271345 A1 | 10/2009 | Rich et al. | |
| 2010/0287106 A1 | 11/2010 | Halkus et al. | |

OTHER PUBLICATIONS

U.S. Appl. No. 12/109,935, Non-Final Office Action, dated May 12, 2011, 15 pg.
U.S. Appl. No. 12/109,935, Final Office Action, dated Jul. 22, 2011, 17 pg.
U.S. Appl. No. 12/109,935, Examiner's Answer, dated Dec. 22, 2011, 23 pg.
U.S. Appl. No. 12/109,935, Decision on Appeal, dated Sep. 26, 2014, 9 pg.
U.S. Appl. No. 12/109,935, Notice of Allowance, dated Jan. 20, 2015, 9 pg.

* cited by examiner

DECLARATIVE DATA WAREHOUSE DEFINITION FOR OBJECT-RELATIONAL MAPPED OBJECTS

CROSS-REFERENCE TO RELATED APPLICATIONS

This application is a Continuation of U.S. application Ser. No. 12/109,935, filed on Apr. 25, 2008.

FIELD OF THE INVENTION

The present invention relates generally to data processing in general and specifically to a simplified method for creating a data warehouse.

BACKGROUND OF THE INVENTION

Businesses need to access historical data to support decision making. The historical data that accumulates over time is stored and used for purposes such as discerning trends from the last year's consumer purchases of a product, or determining whether a price increase affected sales figures for one year over a preceding year. When the decision makers' come up with questions, computer programmers devise queries to obtain data from information stored by the business over time, in order to find information to answer the questions.

Businesses store data in two general ways. First, real time information regarding transactions is stored. For example, online purchases may be entered continuously each day, and shipments may be made within hours of the order being placed. Changes may be made by the purchaser or by the supplier until the transaction is completed. Each order, each purchased item, and each change must be entered into a database by making updates and deletions to the database. Therefore, speed is essential and in order to maximize speed, the size of the database is limited to only that which is necessary.

The second way in which data is stored is to support analysis of business operations over time. The quantity of information stored in such a database can be enormous as information is continuously being deposited. But since the transactions have been completed, the historical data is read-only. In order to reduce the number of records, historical data can be aggregated to a point in time. For example, if five transactions take place to purchase a total of eight units of the same item, the sales can be aggregated for the day to eight. Typically, such read-only, historical, aggregated data. is stored in a data warehouse. A data warehouse is traditionally made up of facts which occur in many dimensions. A data warehouse is optimized specifically for aggregate queries.

A data warehouse consists of fact tables and dimension tables. Fact tables contain the quantitative or factual data about a business. The factual data is the information that will be sought by a query. The fact information often consists of numerical additive measurements and can consist of many columns and millions or billions of rows. Dimension tables are usually smaller and hold descriptive data that reflects the dimensions or attributes of a business. Structured Query Language (SQL) queries then use joins between the fact and dimension tables and constraints on the data to return selected information.

Fact and dimension tables differ from each other only in their use within the data warehouse. The physical structure of fact and dimension tables and the SQL syntax used to create the tables are the same. The terms fact table and dimension table represent the roles these objects play in the logical schema. In terms of the physical database, a fact table has foreign key references to other tables that are usually dimension tables. A dimension table has a primary key that corresponds to the key of an operational database table.

Generally, two types of programmers support a business. An application programmer creates an object model of the business in order to create applications to support day to day operations. A transactional programmer creates relational databases and maps data from the applications. to the relational databases. Normally, an application programmer does not understand the operational database schema because it is created by object-relational mapping performed by the database programmer. A common area to both types of programmers is the object model created by the application programmer.

FIG. 3 depicts object model 300 of a store. The exemplary object model depicted in FIG. 3 captures the basic attributes of the store and the store's place in a larger company. The exemplary object model also captures basic information about the sales for the store and the items which are being sold. For example, in object model 300, class "Store" 310 has store attributes 312 comprising "storeid," "name," and "address." Object "Region" 340. has region elements 342 "regionId" and "name." Class "Division" 360 has division attributes 362 comprising "divisionId," and "name." Class "Person" 350 has person attributes 352 comprising "ssn," "name," "sex," "birthDate," and "location." Class "Invoice" 320 has invoice attributes 322 comprising "invoice number," "data," "balanceDue," and "creditTerms." Class "LineItem" 330 has LineItem attributes 332 comprising "lineItem Number," "count," and "unit price." Class "Item" 370 has Item 372 comprising "upcCode," "retailPrice," "color," "size," "image," and "description." Class Category 380 has Category attributes 382 comprising "categoryId," "name," and "description."

Lines between the classes indicate a one to one or one to many relationship between classes. Line "sales" 390 relates class "Store" 310 and class "Invoice" 320. Line items 391 relates class "Invoice" 320 and class "LineItem" 330. Line categories 392 relates class LineItem 330, Item 370 and Category 380. Line "region" 393 relates class Store 310 to class Region 340. Line "division" 394 relates class Region 340 to class Division 360. Line "manager" 395 relates class "Store." 310 and class "Person" 350. Line "regional manager" 396 relates class "region" 340 and class "Person" 350. Line "divisionPresident" 397 relates class "Division" 360 and class "Person" 350. Line "subcategories" 398 relates back to class Categories 380.

In a typical top-down mapping, the exemplary object model would be transformed into a relational database with primary keys and foreign keys. In some mappings, JOIN tables would establish relationships shown by the lines between objects discussed above. In other instances, WHERE clauses would select the correct row for an item. Class shapes represent the attributes within a class. Table shapes represent the attributes with columns and rows. Top-down mapping translates the class shapes in the object model to table shapes in the relational database. This translation includes naming conventions and more complex transformations required to store object model classes, attributes and relationships in relational tables within a relational database schema. While a database programmer is familiar with the mechanics of translating class shapes to table shapes, an application programmer generally is not.

It is desirable to design the data warehouse for responsiveness to the company decision makers. For the store in the example of FIG. 3, typical questions from decision makers that the database programmer could be called on to support are "what are the 'electronics' sales by division?"; "how did sales in 'Texas' do this quarter?"; and "what are the names of our best and worst selling categories?" These queries do not require access to all of the data captured in a transactional database depicted in the example of FIG. 3. Indeed, to answer these questions, much of the detail in the database can be ignored. What is really needed is an orthogonal view of the data optimized for getting relevant information to support the decision making. Moreover, the specifics of an item or a specific invoice are generally not required. Rather, it is the aggregation of values that is meaningful and manageable. Furthermore, reports answering the questions should provide information in easy to use form. The reader of the report should not have to translate category numbers to names to make sense of a report. Thus a data warehouse designed specifically to support decision making will speed processing. and responsiveness. It would be desirable to have the application programmer create the data warehouse.

As explained above, the application programmer who creates the object model of the business, and the transactional programmer who creates the relational databases, such as the transactional database and data warehouse, are rarely the same person. It would be desirable to have an application programmer create a data warehouse without having to learn the mapping skills of the transactional programmer. Existing tools allow a data warehouse to be described from the operational database. Therefore, the object-relational mapping created by the database programmer for the transactional database could be used by the application programmer but for the fact that the application programmer normally does not have the skills to understand the operational database schema created by the object-relational mapping of the database programmer. But the application programmer does understand the object model. Indeed, normally the application programmer has created the object model. Therefore, a need exists for a way to enable an application programmer without database programming skills to create a data warehouse. Specifically, it would be desirable to have a method adapted to an application programmer to create the data warehouse using the object model and the existing object-relational mapping of the transactional database. The method would have to create and automatically update the data warehouse without requiring the application programmer to reconstruct the relational data relationships of the transactional database. A further need is to create the data warehouse tailored to the reporting needs of the business.

SUMMARY OF THE INVENTION

The invention that meets the needs identified above is a method and apparatus to construct a data warehouse using the relational mapping of a transactional database without reconstructing the data relationships of the transactional database. First, an application programmer analyzes an object model in order to describe facts and dimensions using the objects, attributes, and paths of the object model. Each of the dimensions has an identifier that correlates an item in the transactional database to a dimension record in the data warehouse. The fact and dimension descriptions are saved to a description file. Second, a Data Warehouse Engine (DWE) then access the description file and uses the object model, fact and dimension descriptions, and object-relational mapping to map transactional data to the data warehouse. The DWE also uses the object model, fact and dimension descriptions, and object-relational mapping to generate and execute queries to extract data from the operational database and to insert fact and dimension records into the data warehouse.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Some functions of the present invention may be distributed among a plurality of computers and computer programs. The computer implemented portion of the invention is described best, though, as a single computer program that configures and enables one or more general-purpose computers to implement the novel aspects of the overall invention. For illustrative purposes, the computer program portion of the invention will be referred to as the "Data Warehouse Engine" or "DWE."

Figure 1:
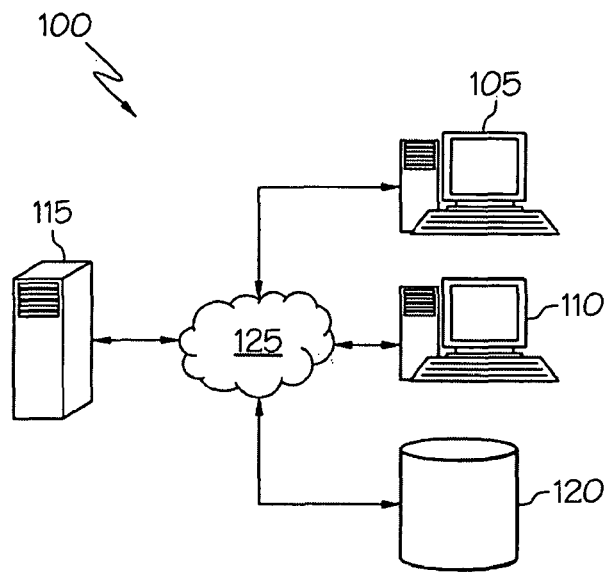
FIG. 1 is an exemplary computer network.

Additionally, the DWE is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging, services to communicate with each other through network connection 125.

Figure 2:
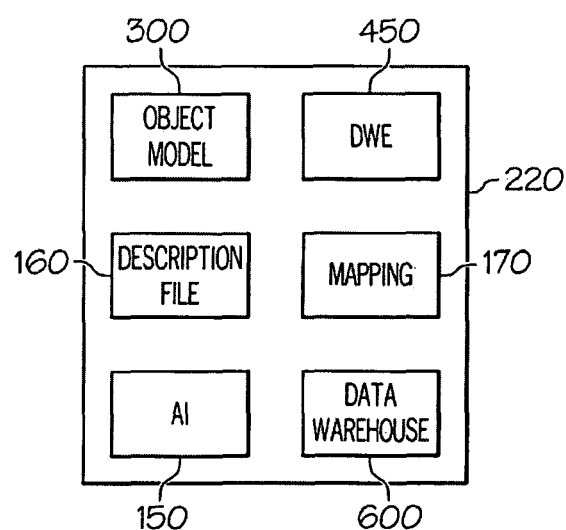
FIG. 2 describes programs and files in a memory on a computer.

DWE 450 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, DWE 450 may reside in more than one memory distributed across different computers, servers, logical partitions, or other hardware devices. The elements depicted in memory 220 may be located in or distributed across separate memories in any combination, and DWE 450 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to DWE 450, memory 220 includes object model 300, artificial intelligence program 150, description file 160, and mapping file 170. Data warehouse 600 will be created by the interaction of DWE 450 with object model 300, description file 160, and mapping file 170.

Figure 3:
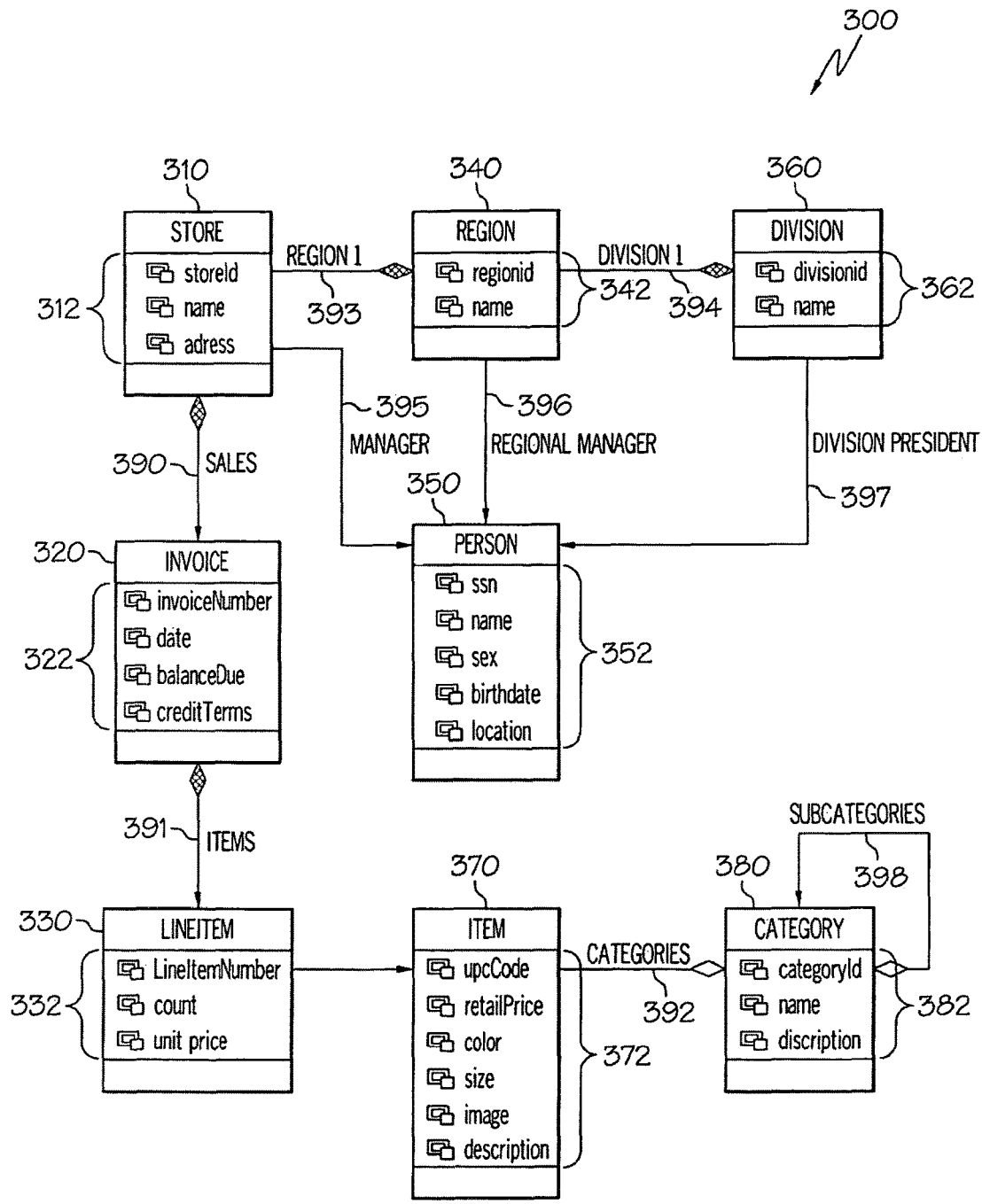
FIG. 3 depicts an exemplary transactional database for a hypothetical store.
Figure 4A:
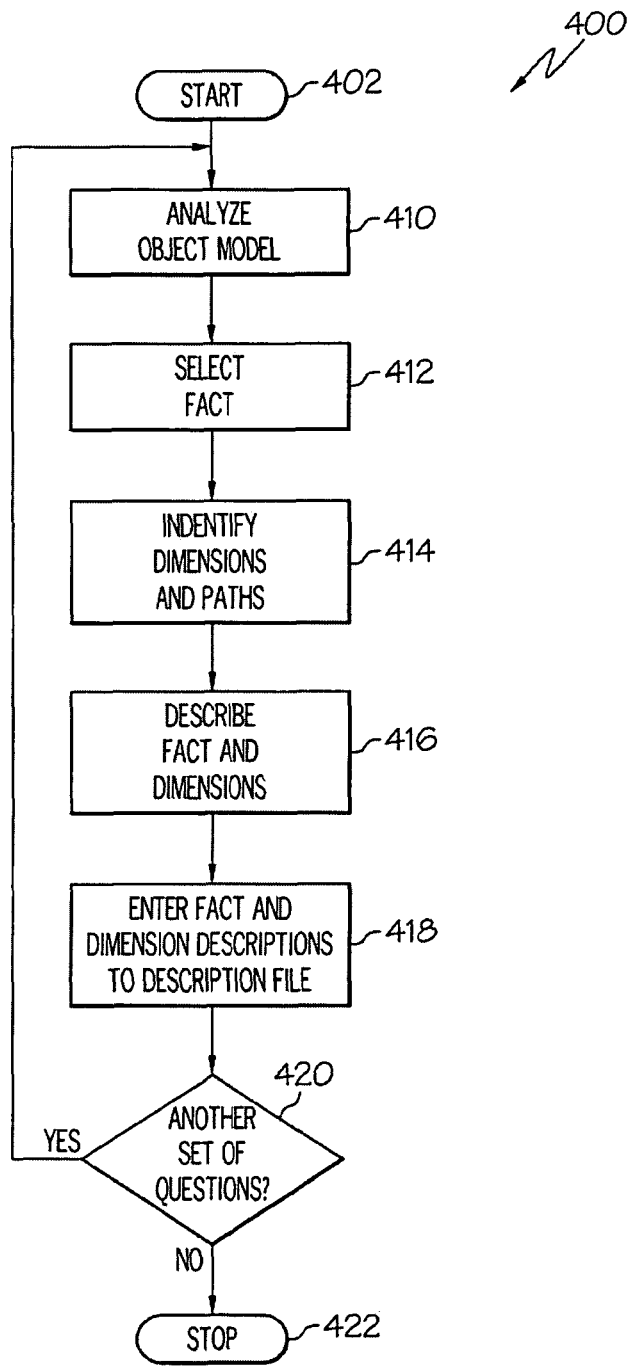
FIG. 4A depicts a flow chart for the application programmer's process.

FIG. 4A depicts the process followed by the application programmer to prepare DWE 450 for operation by placing the necessary descriptions into description file 170. The application programmer starts (402) by analyzing the object model with regard to the type of questions decision makers in the business will want to have answered from the database. Using the example in FIG. 3, the following questions are questions that decision makers may ask and require a data warehouse to support: "what are the 'electronics' sales by division?"; "how did sales in 'Texas' do this quarter?"; and "what are the names of our best and worst selling categories?" The object model is analyzed in regard to the questions to find a common element (410). In one embodiment, the application programmer examines a graphical representation of the object model, such as the graphical representation shown in FIG. 3, and marks up the fact and dimension details. In the example of FIG. 3, the common element in the three questions is "sales." More specifically, the common element is a dollar amount of sales. The application programmer identifies the fact from an analysis of the questions. In an alternate embodiment (not shown), the application programmer may interact with artificial intelligence program AI 150, enter the questions into AI 150, and AI 150 will identify the fact.

Next the application programmer identifies dimensions and dimension paths for the data warehouse (414). Dimensions will be tables in which the fact will be aggregated and to which the fact can be correlated to answer the questions. The questions previously presented are again analyzed: "what are the 'electronics' sales by division?"; "how did sales in 'Texas' do this quarter?"; and "what are the names of our best and worst selling categories?" The italicized words are words that indicate the dimensions needed to answer the questions. In this case, three potential dimensions are identified. For the first question, the key term is "division." Object "Division" 360 lies at the end of a path from object "Store" 310 that includes object "region" and object "division." It would be preferable to support queries that can respond by store, region or division, rather than just division. Therefore, a store dimension would give the data warehouse the most flexibility in response. For the second question, the key word is "quarter." The object model does not contain an element for "quarter." But element "date" in object Invoice 320 can identify a particular period. For the third question, "categories" is found in object "Category" 380. The paths connecting the dimensions are identified. The application programmer would most likely perform the fact and dimension analysis by looking at a graphical representation of the object model and marking up the fact and dimension details.

The application programmer describes the fact and the dimensions (416). In the example, the fact chosen is the dollar amount of a sale. The dollar amount of a sale is "count times unit price" for a LineItem in an invoice. The fact can be described in a first description as a "select lineItemNumber, (li.count*li.unitPrice) as saleAmount from LineItem li" in Enterprise Java Beans Query Language (EJBQL) terms. The application programmer enters the fact and dimension descriptions into description file 160. In an alternative embodiment, writing the descriptions can be automated using AI 150.

Figure 5:
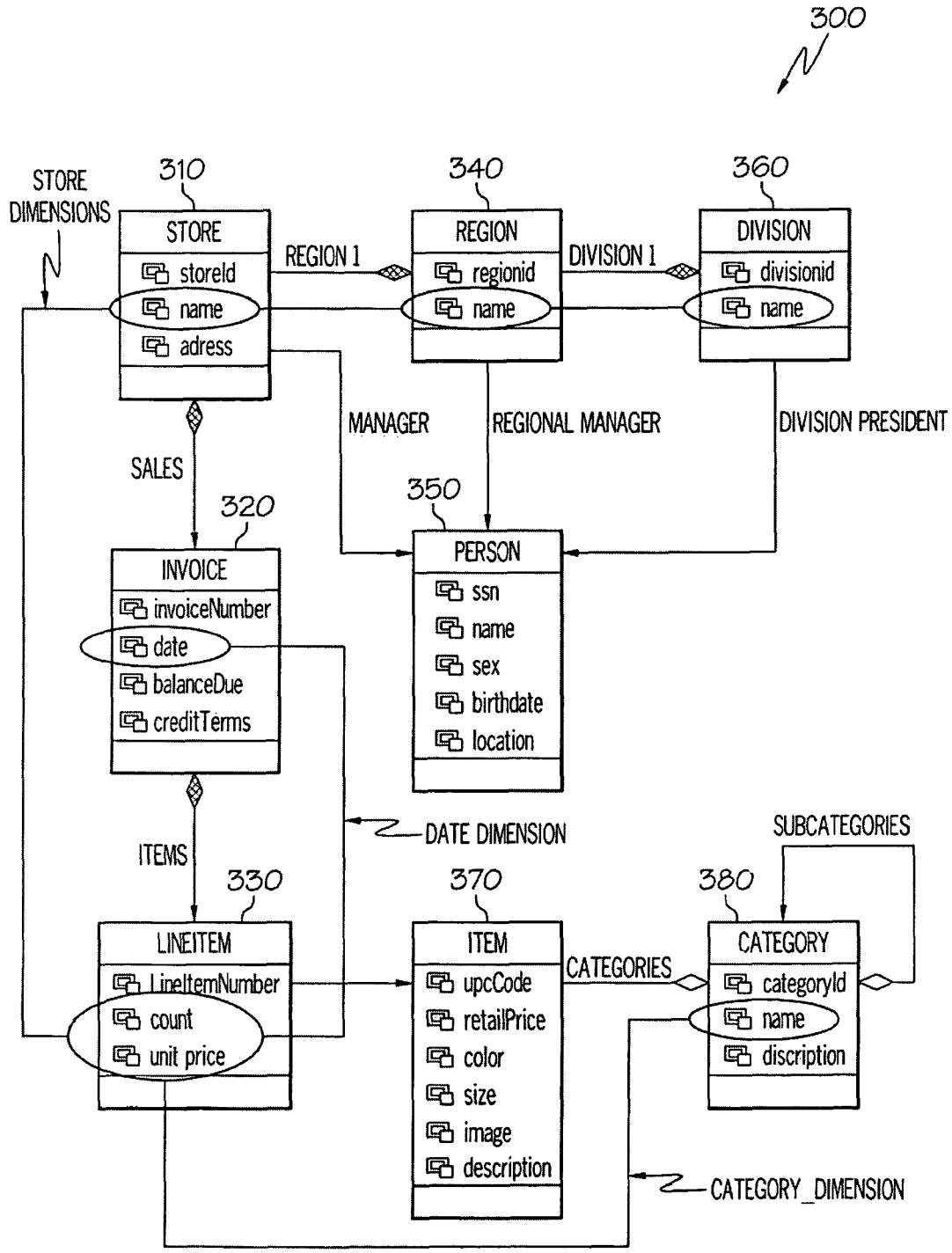
FIG. 5 depicts a marked up exemplary transactional database for the hypothetical store.

The paths are shown by arrows linking tables in FIG. 5. For example, Object "LineItem" 330 contains the elements of the fact description for sales and is linked to Store element 310 by Invoice 320. Likewise LineItem 330 is linked to object Item 370 and object Category 380. LineItem 330 is linked to the object "Category" 380 and also to objects Invoice 320 and Store 310. These paths are shown in FIG. 5 by the lines linking the respective objects. For example, a fact captured in this diagram may be described as LINEITEM.count*LINEITEM.unit price.

The application programmer translates the first description into a second description using a dotted notation. A dotted notation is common for referring to object paths in query languages such as EJBQL or Hibernate's HQL. For example, the three-dimensions could be described in a pseudo-syntax as follows:

Dimension category Dimension (category c): Id id: "c.categoryId", name: "c.name";

DateDimension DateDimension (Date d): Id timestamp( )", Integer year: "d.year", Integer.month: "d.month", Integer week; "d.weekOfYear", etc. . . . "

Dimension StoreDimension (Store's): Id storeId: "s.storeId", String storeName: "s.name", String regionName: "s.region.name", String division_name: "s.region. division.name";

The second descriptions provide enough information to create or identify a dimension record from a related object instance. The longer paths, like Store→Region→Division allow for aggregation at the outer levels and drill-down to more-fine-grained totals.

Next, the application programmer combines the first description and the second description. The combined description will be aggregated is as follow:

Fact Sales Fact (LineItem li.):
BigDecimal salesAmount: "li.count*li.unitprice; //compute the basic fact
CategoryDimension: "li.item.category"; //select a Category that can be used to create or correlate to a Category Dimension record DateDimension: "li.invoice date"; //select a Date that can be used to create or correlate to a Date Dimension record StoreDimension: "li.invoice store"; //select a Store that can be used to create or correlate to a Store Dimension record In this example, all of the dimensions have identifiers which can be used to correlate items in the transactional data base to dimension records in the data warehouse. In more complex cases, dimension identifiers would have to be computed and correlated to their transactional equivalent. This is a well known issue in data warehouse transformation. Evolution of dimension values is no different from traditional warehouse dimensions, and the same well-known solutions apply.

The application programmer then enters the fact and dimension descriptions to a description file such as description file 160 418). If another set of questions is to be analyzed (420), the application programmer will go to step 410, and if not, will stop (422).

Figure 4B:
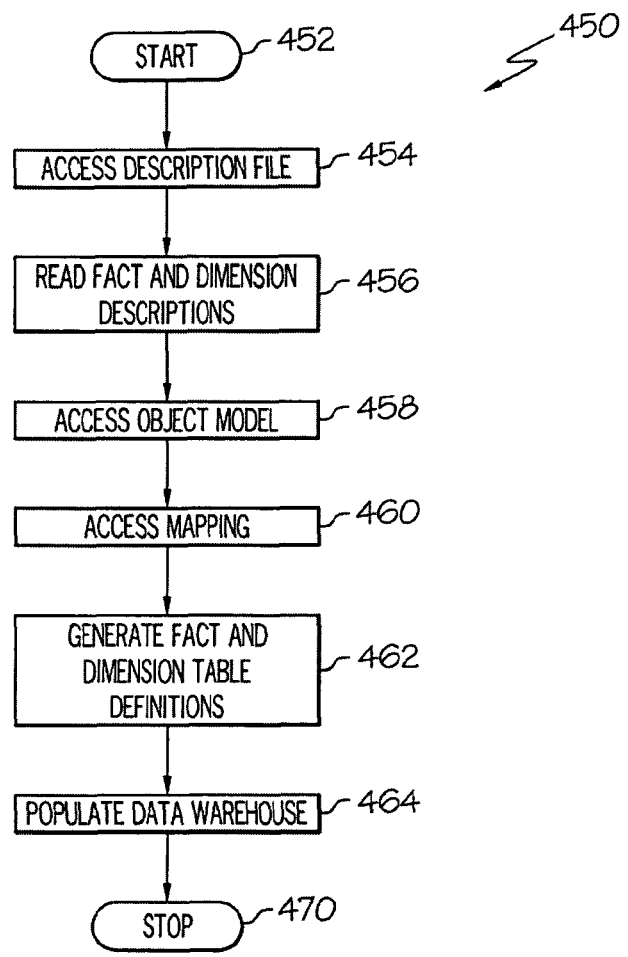
FIG. 4B depicts a flow chart of the data warehouse engine process.

Referring to FIG. 4B, DWE 450 starts (452) and accesses description file 160 (454). DWE 450 reads the fact and dimension descriptions (456), accesses the object model (458), and accesses the object relationship mapping in mapping file 170 (458). DWE 450 then generates the data warehouse schema for the described facts and dimensions (462). The database schema includes the table and column names and types and the fact to dimension foreign keys. The database schema is generated using the object model, the fact and dimension descriptions, and the object relational mapping to generate fact and dimension table definitions for the data warehouse.

Once DWE 450 has generated the fact and table definitions for the data warehouse, queries can be made, data extracted, and fact and dimension records inserted into the data warehouse using the object model, the fact and dimension descriptions, and the object relational mapping. DWE 450 uses the table definitions to create data warehouse tables. DWE 450 then automatically populates the data into the data warehouse tables (464). DWE 450 stops (470).

Moreover, once DWE 450 has generated the fact and table definitions for the data warehouse, DWE 450 can produce fact records by a query of fact values for each dimension combination, and dimension records by a query of dimension values according to the path descriptions. When a change is made to an object-relational mapping in the mapping file, DWE 450 adjusts fact and dimension queries and fact and dimension table definitions accordingly. Furthermore, when a change is made to the object-relational mapping in the mapping file, DWE uses the new object relational mapping to process a new logical description of the data warehouse and to produce a new plurality of data warehouse definitions and data extraction queries.

Figure 6:
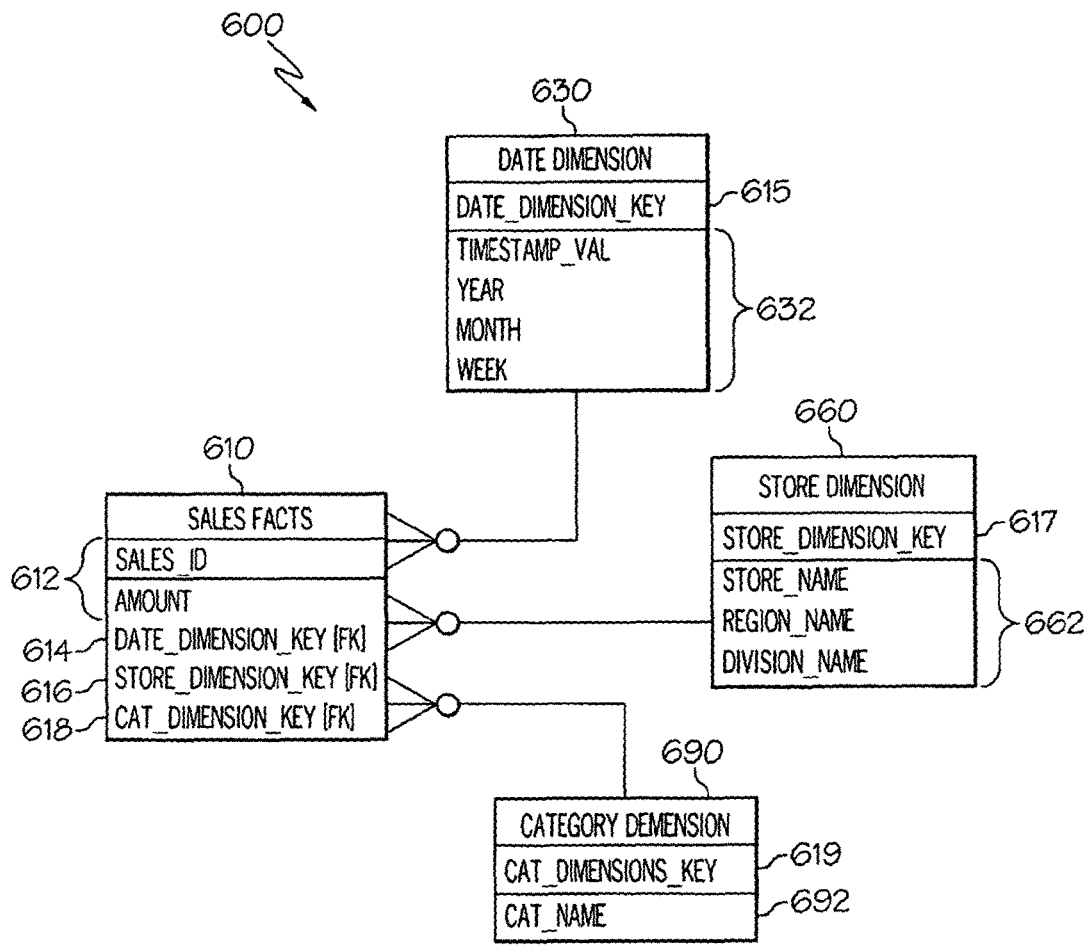
FIG. 6 depicts a data warehouse created in accordance with the data warehouse engine for the hypothetical store.

Data warehouse 600 is depicted in FIG. 6. Data warehouse 600 was populated using DWE 450. Fact table "Sales_Facts 610 has attributes 612 Sales_ID and Amount. Sales_Facts 610 has three foreign keys. Specifically, the foreign keys are foreign key "Date_Dimension_Key" 614, foreign key Store_Dimension_Key 616, and foreign key Cat_Dimension_Key 618. Foreign key "Date_Dimension_Key" 614 is the primary key "Date_Dimension_Key" 615 for Date_Dimension Table 630. Date_Dimension Table 630 has attributes 632 comprising Timestamp_Val, Year, Month, and Week. Foreign key "Store_Dimension_Key 616 is primary key Store.sub.13 Dimension_Key 617 for "Store_Dimension" 660. Store_Dimension Table 660 has attributes 662 Store_Name, Region_Name, and Division_Name. Foreign key "Cat_Dimension_Key" 618 is primary key "Cat_Dimension_Key" 619 for Category Dimension 690. Category_Dimension Table 690 has attribute Cat_Name 692. The resulting data warehouse is radically simpler than the top-down relational schema that is required for the full object model.

Dimension records are produced by an object query of dimension record elements. Fact records are produced by queries which aggregate the fact values for each dimension combination which exists. By way of example, an EJBQL query derived from the fact dimension above is set forth as follows:

select (li.count*li.unitPrice) as salesAmount, li.sale.date, li.item.category.categoryId, li.sale.store . . . storeId from LineItem li group by li.sale.date, li.item.category.categoryId, li.sale.store.storeId Persons skilled in the art will recognize that EJBQL queries are one way of producing object object queries, and that persons skilled in the art can produce object queries in a variety of different ways.

The sales facts produced by this query will support analytical queries about sales per time period in general, sales per store/region/division, sales by category, and all the permutations of those dimensions. If the object-relational mapping strategy changes, the fact and dimensions queries will be adjusted accordingly.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for creating a data warehouse, comprising:
   reading a plurality of fact and dimension descriptions from a description file;
   accessing a mapping file containing a plurality of object-related mapping for a transactional database;
   generating, using the plurality of fact and dimension descriptions, a plurality of fact and dimension table definitions for the data warehouse; and
   populating, using the fact and dimension table definitions and the plurality of object-related mapping, the data warehouse, wherein
   each of the plurality of fact and dimension descriptions includes an identifier correlating an item in the transactional database to a record in the data warehouse.

2. The method of claim 1, wherein
   a plurality of fact records are produced by a query of a plurality of fact values for each of a plurality of dimension combinations.

3. The method of claim 1, wherein
   a plurality of dimension records are produced by a query of a plurality of dimension values according to a plurality of path descriptions.

4. The method of claim 1, wherein
   a plurality of fact and dimension queries are adjusted based upon a change being made to an object-relational mapping in the mapping file.

5. The method of claim 1, wherein
   a plurality of fact and dimension table definitions are adjusted based upon a change being made to an object-relational mapping in the mapping file.

6. The method of claim 1, wherein a new object-relational mapping is used to process a logical description of the data warehouse and produce a plurality of data warehouse definitions and a plurality of data extraction queries upon a change being made to an object-relational mapping in the mapping file.

7. A computer hardware system configured to create a data warehouse, comprising:
at least one hardware processor configured to perform:
reading a plurality of fact and dimension descriptions from a description file;
accessing a mapping file containing a plurality of object-related mapping for a transactional database;
generating, using the plurality of fact and dimension descriptions, a plurality of fact and dimension table definitions for the data warehouse; and
populating, using the fact and dimension table definitions and the plurality of object-related mapping, the data warehouse, wherein
each of the plurality of fact and dimension descriptions includes an identifier correlating an item in the transactional database to a record in the data warehouse.

8. The system of claim 6, wherein a plurality of fact records are produced by a query of a plurality of fact values for each of a plurality of dimension combinations.

9. The system of claim 6, wherein a plurality of dimension records are produced by a query of a plurality of dimension values according to a plurality of path descriptions.

10. The system of claim 6, wherein a plurality of fact and dimension queries are adjusted based upon a change being made to an object-relational mapping in the mapping file.

11. The system of claim 6, wherein a plurality of fact and dimension table definitions are adjusted based upon a change being made to an object-relational mapping in the mapping file.

12. The system of claim 6, wherein a new object-relational mapping is used to process a logical description of the data warehouse and produce a plurality of data warehouse definitions and a plurality of data extraction queries upon a change being made to an object-relational mapping in the mapping file.

13. A computer readable memory, comprising a computer readable storage memory having stored therein computer program code for creating a data warehouse, the computer program code, which when executed by a computer hardware system causes the computer hardware system to perform:
reading a plurality of fact and dimension descriptions from a description file;
accessing a mapping file containing a plurality of object-related mapping for a transactional database;
generating, using the plurality of fact and dimension descriptions, a plurality of fact and dimension table definitions for the data warehouse; and
populating, using the fact and dimension table definitions and the plurality of object-related mapping, the data warehouse, wherein
each of the plurality of fact and dimension descriptions includes an identifier correlating an item in the transactional database to a record in the data warehouse.

14. The memory of claim 12, wherein a plurality of fact records are produced by a query of a plurality of fact values for each of a plurality of dimension combinations.

15. The memory of claim 12, wherein a plurality of dimension records are produced by a query of a plurality of dimension values according to a plurality of path descriptions.

16. The memory of claim 12, wherein a plurality of fact and dimension queries are adjusted based upon a change being made to an object-relational mapping in the mapping file.

17. The memory of claim 12, wherein a plurality of fact and dimension table definitions are adjusted based upon a change being made to an object-relational mapping in the mapping file.

18. The memory of claim 12, wherein a new object-relational mapping is used to process a logical description of the data warehouse and produce a plurality of data warehouse definitions and a plurality of data extraction queries upon a change being made to an object-relational mapping in the mapping file.

* * * * *